Aug. 10, 1937.  F. M. CLARK  2,089,685

ELECTRIC CAPACITOR

Filed Nov. 30, 1934

Inventor:
Frank M. Clark,
by Harry E. Dunham
His Attorney.

Patented Aug. 10, 1937

2,089,685

UNITED STATES PATENT OFFICE 2,089,685

ELECTRIC CAPACITOR

Frank M. Clark, Pittsfield, Mass., assignor to General Electric Company, a corporation of New York Application November 30, 1934, Serial No. 755,428

10 Claims. (Cl. 175—315)

The present invention is concerned with electrical capacitors or condensers of the so-called "dry type", and its object is to improve the operating efficiency and reliability of such devices.

In a co-pending application of Clark and Ruscetta Serial No. 755,426, filed Nov. 30, 1934, there are described and claimed electrical capacitors containing as void-filling agents between the capacitor armatures substantially anhydrous organic acid, such, for example, as anhydrous acetic acid. The organic acid may be used with or without a thickening agent, such as a cellulose compound, as described in said co-pending application. In another co-pending application Serial No. 755,425, filed Nov. 30, 1934, there is described and claimed a capacitor containing a concentrated organic acid associated with a resistance-reducing material, such as ammonium borate or other suitable salt. Various equivalent organic acids, both of the aliphatic and cyclic series, are described in said respective co-pending applications.

It is a novel feature of the present invention to employ a water-soluble organic acid (with or without associated materials such as a thickening agent or a resistance-modifying agent) in combination with a minor proportion of water as an impregnating medium for capacitors. Water may be present in amounts up to about 15% by weight of the amount of acid in the impregnating composition. The improvement effected in acid compositions for use in capacitors consists in an increased "self-curing" property of the capacitor if the oxide film, which is originally produced upon the armatures or electrodes, becomes depreciated or destroyed for any reason. The self-curing property of a film-forming capacitor containing acid is believed to be due to the increased efficiency of a water-containing impregnating composition acting as an electrolyte to oxidize the capacitor armatures. This is particularly true in capacitors containing a salt, such as the borate above mentioned, as such salt is more soluble in acid containing water than in a substantially anhydrous acid. The presence of the salt in solution also lowers the resistivity of the acid and thereby improves the efficiency of a capacitor impregnated with such composition.

Figure 1:
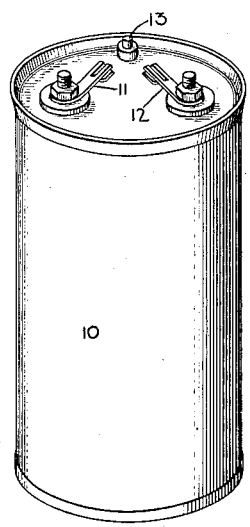
Figure 2:
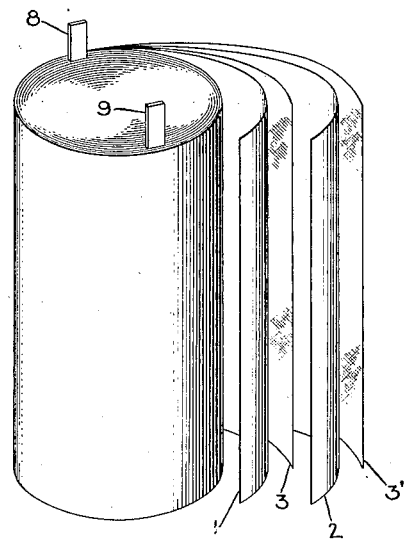
Figure 3:
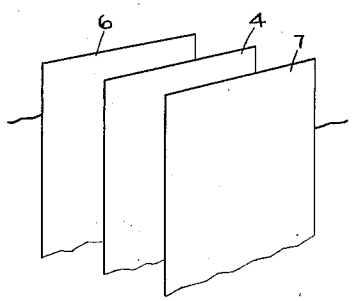
Figure 4:
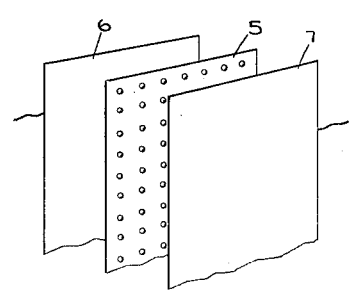

My invention will be more fully explained in connection with the accompanying drawing in which Fig. 1 is a perspective view of a completed capacitor; Fig. 2 illustrates a roll type of capacitor, shown partly unrolled; and Figs. 3 and 4 are diagrammatic representations of stacked capacitors.

Referring to the drawing, the capacitor illustrated by Fig. 2 comprises armatures or electrodes 1, 2 of suitable metal, for example, aluminum, tantalum, or magnesium. The capacitor armatures ordinarily consist of aluminum foil having a thickness of about .001 to .003 inch. Between them is located a porous spacer 3 of imbibitory material, such, for example, as cheesecloth, or porous paper, which is impregnated or filled with the acid during the fabrication of the capacitor. In the drawing two spacers 3 and 3' have been shown, the capacitor of Figs. 1 and 2 being of the rolled type and it being desired that the spacer should be present in all cases between adjacent turns of the wound-up strip armatures.

The spacer 3, 3' which preferably consists of cheesecloth, should be free from chlorides, and may have a thickness between the limits of about .0025 and .0055 inch, although this thickness is not critical. The thread count can be varied over a wide range. I have found cheesecloth having a thread count of 40 x 44 to be satisfactory. A paper spacer having a porosity similar to that of blotting paper may be used, as shown at 4, Fig. 3. The thickness of the paper while not critical may be between the limits of .00075 and .001 inch. The spacer may be perforated, that is, provided with closely placed holes, as shown at 5, Fig. 4. It has been determined that paper containing one m. m. diameter perforations spaced 1 to 2 m. m. apart is satisfactory. A spacer is not an absolutely essential part of the present invention and may be omitted, the composition being spread on the electrodes. Its use, however, is recommended.

Before the electrodes are assembled a film of oxide, may, and preferably should, be produced thereon, preferably by electrolytic treatment in accordance with well understood practice. While the electrodes commonly consist of lengths of thin metal foil, as shown in Fig. 2, it is permissible to use plates which may be flat, as indicated at 6, 7, in Fig. 3, or of corrugated, or other form.

A suitable electrolyte is employed for the preliminary electrolytic oxidation treatment. For example, a solution made by dissolving 80 parts of boric acid and 2 parts of borax by weight in 1000 parts of distilled water is suitable. These constituents may be varied considerably without seriously affecting the results. The oxidation treatment can be carried out entirely in one container, or the electrode material when consisting of long strips of foil, can be traversed successively through a series of electrolytic baths in different containers, the baths increasing in concentration as the foil progresses from the first to the last bath.

Preferably the electrolyte is heated during the forming process, a temperature of about 90 to 95° C. being suitable. The voltage at which the electrolytic treatment is carried out preferably should be equal to or not more than about ten per cent greater than the voltage at which the completed capacitor is intended to be operated. For capacitors desired for alternating current operation the treatment of the foil, plates, or other form of electrodes, may be carried out either with alternating or direct current. Preferably direct current is used, employing a voltage equal to or slightly exceeding the peak of the alternating current voltage at which the capacitors are intended to be operated. Aluminum foil intended for operation in the completed capacitor with 110 volt alternating current may be oxidized by direct current treatment, the foil being made the anode and a voltage of 160 volts being applied between anode and cathode.

The rate of the passage of the foil through the electrolyte and the amount of current depends upon the conditions, as well understood. Ordinarily a foil when the oxidizing treatment has been completed should not pass more than one ampere per square foot at 160 volts, direct current, while immersed in electrolyte, as above described, and at a temperature of 95° C. After the foil has been oxidized, it may be dried and stored in a dry environment until it is desired for use.

The capacitors are assembled in accordance with well understood practice; for example, by rolling (Fig. 2), or stacking (Figs. 3 and 4), the oxidized foil and the spacer being in proper relation. While it is necessary in capacitors intended for alternating current use to have both armatures filmed or oxidized, it is sufficient when the capacitors are intended for direct current use to have but one foil or armature (the anode) provided with an oxide film. The cathode need not be oxidized and in fact may consist of any metal inert with respect to the electrolyte. Electrical connections are made to the respective armatures in accordance with well understood practice as by folding back one end of each foil and attaching to it strips 8 and 9 of desired width, for example, about one-half inch, to make electrical connection to exterior terminals.

When acetic acid is used as impregnating material, it is associated, as already indicated, with water up to a content of water of about 15% by weight of the acid. Preferably I employ a water content of about 10%. In place of acetic acid various other liquid monocarboxylic organic acids which are capable of being associated with water may be used. Examples of such acids of the aliphatic series are propionic acid, acrylic acid, butyric acid. Chemical derivatives of monocarboxylic acids may be used, such as the hydroxy derivatives as represented by lactic acid, hydroxy acrylic acid, crotonic acid, ethylene lactic acid and dihydroxy propionic acid.

Other examples are isobutyric acid, diethyl acetic acid, iso-amyl acetic acid and iso-butyl acetic acid. In general, all of these acids are characterized by water-solubility to varying degree. The electrical resistivity of the acid mixture should be less than $1 \times 10^6$ ohms per centimeter cube. While I do not wish to have my invention limited by any particular theory of operation, I may say that I believe the acid impregnant functions as an electrolyte. While, for purpose of illustration, I have referred to a particular capacitor assembly comprising oxidized aluminum foil and a cheesecloth or paper spacer, I do not desire it to be understood as being limited to this particular structure.

The presence of water is advantageous especially when a salt is used in conjunction with the organic acid. As described in my copending application, Serial No. 755,425, filed concurrently herewith, such a modifying salt may consist of ammonium acid borate, sodium borate, sodium potassium tartrate, ammonium phosphate, sodium acetate and ammonium acetate. For example, in the case of the acetic acid impregnant containing water, the solubility of the ammonium acid borate increases rapidly with water content. In an acetic acid solution which is substantially anhydrous only approximately 1% of the borate goes into solution at 25° C. When about 15% by weight of water is present the solubility of the borate has increased to approximately 7½%. As stated in said copending application about 1 gram molecule of ammonium borate may be suspended in approximately 3.7 gram molecules of acetic acid, thereby forming a mushy mass.

A condenser assembly such as above described and shown in the drawing is impregnated in the acid mixture by immersion for about one hour. During the impregnation the mixture may be heated to temperatures above room temperature and as high as 100° C. After about one hour immersion the impregnated capacitor is subjected while still in the liquid state for about one hour to intermittently or continuously applied voltage. The object of this voltage treatment is to cure any defective or unoxidized spots on the aluminum. This voltage treatment may be carried out at a temperature above room temperature and as high as 60 to 75° C., but not higher than 100° C. Direct current application is preferred, for example, in the case of a capacitor rated for operation at 110 volts alternating current the curing treatment may be carried out at 160 volts direct current. It is preferable to reverse the polarity at intervals, say once each twenty seconds.

The capacitor assembly is cooled to room temperature if the impregnation has been carried out at an elevated temperature. It is then sealed in a container 10 (Fig. 1), and connections are made from the strips 8, 9 to the external contacts 11, 12. The container may consist of aluminum, and is suitably insulated from the filling liquid. The treated capacitor assembly may be totally surrounded in its container by wax which preferably should have a melting point between 75 to 100° C. and should be unaffected chemically by the acid impregnant. A second topping layer of sealing compound may be applied consisting, for example, of a high melting asphalt. A breather vent 13 may be provided.

Capacitors prepared in accordance with my invention possess both high capacity and low power factor and, as already indicated above, are less subject to deterioration by non-use than are capacitors unassociated with water. They also possess improved self-restoring characteristics after having been subjected to voltages above a desired operating range which in some electrolytic capacitors tends to depreciate or destroy the film on the armatures.

What I claim as new and desire to secure by Letters Patent of the United States is:

1. An electric device comprising the combination of juxtaposed armatures at least one of which is film-forming and an uncombined, water-soluble organic acid diluted by a substantial amount, up to about 15 per cent, of water.

2. An electric capacitor comprising the combination of juxtaposed film-forming armatures, a porous spacer therebetween and uncombined acetic acid associated with a substantial amount, up to about 15 per cent, of water filling voids in said spacer.

3. An electric capacitor comprising the combination of cooperating film-forming armatures, a porous spacer therebetween and an impregnant filling void in said spacer, said impregnant consisting substantially wholly of uncombined water soluble monocarboxylic organic acid and about 10 per cent of water, by weight, the electrical resistivity of said impregnant being less than $1 \times 10^6$ ohms per centimeter cube.

4. A capacitor of the dry type containing closely adjacent electrodes, at least one of which consists of film-forming metal, a porous spacer held therebetween and an impregnant for said spacer, one of the essential ingredients of which consists of uncombined water-soluble liquid organic acid, such acid being associated with a substantial amount up to 15 per cent of water.

5. A capacitor of the dry type containing closely adjacent electrodes, at least one of which consists of film-forming metal, a porous material filling the space therebetween, and an impregnant for said material, one of the essential ingredients of which consists of uncombined crotonic acid, such acid being associated with a substantial amount up to 15 per cent of water.

6. An electric capacitor comprising closely adjacent aluminum electrodes separated from one another only by porous paper and an impregnant for said capacitor in which uncombined water-soluble monocarboxylic organic acid is an essential ingredient, such acid being associated only with less than 15 per cent of water, and with a substantial amount of a salt.

7. An electric capacitor comprising aluminum armatures, a porous paper spacer therebetween, said paper being impregnated with acetic acid associated with about ten per cent of water.

8. An electric capacitor comprising aluminum armatures, a porous paper spacer therebetween, said paper being impregnated with lactic acid associated with about ten per cent of water.

9. An electric capacitor comprising the combination of juxtaposed film-forming armatures, a porous spacer therebetween and uncombined acetic acid associated with a substantial amount, up to about 15 per cent, of water, and a substantial amount of a salt, said mixture filling voids in said spacer.

10. An electric capacitor comprising the combination of juxtaposed film-forming armatures, a porous spacer therebetween and uncombined acetic acid associated with a substantial amount, up to about 15 per cent, of water, and a substantial amount of ammonium acid borate, said mixture filling voids in said spacer.

FRANK M. CLARK.